United States Patent
Kruckenberg (10) Patent No.: US 11,358,321 B2
(45) Date of Patent: Jun. 14, 2022

(54) SYSTEMS AND METHODS FOR THERMOFORMING THERMOPLASTIC STRUCTURES

(71) Applicant: ROHR, INC., Chula Vista, CA (US)

(72) Inventor: Teresa Kruckenberg, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 241 days.

(21) Appl. No.: 16/673,482

(22) Filed: Nov. 4, 2019

(65) Prior Publication Data

US 2021/0129411 A1 May 6, 2021

(51) Int. Cl.
| | |
|---|---|
| B29C 51/08 | (2006.01) |
| B29C 51/30 | (2006.01) |
| B29C 51/42 | (2006.01) |
| B29K 101/12 | (2006.01) |
| B29K 105/00 | (2006.01) |

(52) U.S. Cl.
CPC ............ B29C 51/082 (2013.01); B29C 51/30 (2013.01); B29C 51/421 (2013.01); B29K 2101/12 (2013.01); B29K 2105/256 (2013.01)

(58) Field of Classification Search
CPC ..... B29C 70/46; B29C 51/421; B29C 51/082; B29C 51/30; B29C 53/04; B29C 53/083; B29K 2101/12; B29K 2105/256
See application file for complete search history.

(56) References Cited

U.S. PATENT DOCUMENTS

| | | | |
|---|---|---|---|
| 9,278,484 B2 | 3/2016 | Guzman et al. | |
| 9,498,915 B2 | 11/2016 | Bartel et al. | |
| 9,707,724 B2 | 7/2017 | Tsotsis | |
| 10,086,596 B2 | 10/2018 | Desjardien et al. | |
| 10,315,750 B2 | 6/2019 | Stewart | |
| 10,369,740 B2 | 8/2019 | Chapman et al. | |
| 10,434,726 B1 | 10/2019 | Hickman et al. | |
| 2009/0133818 A1 | 5/2009 | Gautier et al. | |
| 2018/0009155 A1* | 1/2018 | Langeveld | ............. B29C 53/84 |

FOREIGN PATENT DOCUMENTS

DE      4335062      4/1995

OTHER PUBLICATIONS

European Patent Office, Partial European Search Report dated Mar. 19, 2021 in Application No. 20205678.4.
European Patent Office, European Search Report dated Jun. 22, 2021 in Application No. 20205678.4.

* cited by examiner

*Primary Examiner* — Monica A Huson
(74) *Attorney, Agent, or Firm* — Snell & Wilmer L.L.P.

(57) ABSTRACT

A thermoforming method includes heating a thermoplastic panel to a forming temperature, and compressing the thermoplastic panel between a first tool and a second tool, wherein the thermoplastic panel is bent about a first axis extending along a first direction with respect to the thermoplastic panel in response to being compressed between the first tool and the second tool. The thermoplastic panel may then be cooled to a hardened temperature and disposed between a third tool and a fourth tool. The method further includes heating the thermoplastic panel to the forming temperature, and compressing the thermoplastic panel between the third tool and the fourth tool, wherein the thermoplastic panel is bent about a second axis extending along a second direction with respect to the thermoplastic panel in response to being compressed between the third tool and the fourth tool.

20 Claims, 8 Drawing Sheets

SYSTEMS AND METHODS FOR THERMOFORMING THERMOPLASTIC STRUCTURES

FIELD

The present disclosure relates generally to thermoplastics manufacturing, and more specifically to systems and methods for forming thermoplastic structures.

BACKGROUND

Various industries include components having multi-dimensional charges for various uses. For example, the aerospace industry utilizes nacelles for various applications for providing a protective housing around adjacent components as well as for providing an aerodynamic surface for reducing drag, among other applications. For example, a fan cowl is used for housing various components of a turbine engine and provides an aerodynamic surface for the turbine engine and related systems. A fan cowl outer skin is typically made from metal or carbon fiber. A fan cowl may be formed using one or multiple charges that are connected together to form a single, large cowl half coupled to the nacelle structure via a hinge. Some fan cowl outer skins may be made via a carbon fiber layup process that comprises various stacking and curing steps that can take many hours to complete.

SUMMARY

A method for forming a reinforced thermoplastic is disclosed, comprising heating a thermoplastic panel to a forming temperature at a first time, compressing the thermoplastic panel between a first tool and a second tool while the thermoplastic panel is at the forming temperature, wherein the thermoplastic panel is bent about a first axis extending along a first direction with respect to the thermoplastic panel in response to being compressed between the first tool and the second tool, cooling the thermoplastic panel to a hardened temperature, the hardened temperature is cooler than the forming temperature, disposing the thermoplastic panel between a third tool and a fourth tool, heating the thermoplastic panel to the forming temperature at a second time while maintaining tension on the thermoplastic panel to maintain a curvature of the thermoplastic panel about the first axis, and compressing the thermoplastic panel between the third tool and the fourth tool while the thermoplastic panel is at the forming temperature, wherein the thermoplastic panel is bent about a second axis extending along a second direction with respect to the thermoplastic panel in response to being compressed between the third tool and the fourth tool.

In various embodiments, the thermoplastic panel is heated to the forming temperature at the first time via an infrared lamp.

In various embodiments, the thermoplastic panel is heated to the forming temperature at the second time via an infrared lamp.

In various embodiments, a central portion of the thermoplastic panel is heated to the forming temperature and a peripheral edge of the thermoplastic panel remains below a glass transition temperature to aid in evenly distributing said tension.

In various embodiments, the thermoplastic panel is heated to the forming temperature at the first time via a first flexible heater.

In various embodiments, the thermoplastic panel is heated to the forming temperature at the first time via the first flexible heater and a second flexible heater.

In various embodiments, the thermoplastic panel is heated to the forming temperature at the second time via a first flexible heater.

In various embodiments, the thermoplastic panel is heated to the forming temperature at the second time via the first flexible heater and the second flexible heater.

In various embodiments, the first direction is substantially perpendicular to the second direction.

A method for forming a reinforced thermoplastic is disclosed, comprising heating a thermoplastic panel to a forming temperature at a first time, compressing the thermoplastic panel between a first tool and a second tool while the thermoplastic panel is at the forming temperature, cooling the thermoplastic panel to a hardened temperature, the hardened temperature is cooler than the forming temperature, disposing a first flexible heater on a first surface of the thermoplastic panel, disposing the thermoplastic panel between a third tool and a fourth tool, heating the thermoplastic panel to the forming temperature at a second time via the first flexible heater, and compressing the thermoplastic panel between the third tool and the fourth tool while the thermoplastic panel is at the forming temperature.

In various embodiments, the method further comprises disposing a second flexible heater on a second surface of the thermoplastic panel, wherein the thermoplastic panel is heated to the forming temperature at the second time via the first flexible heater and the second flexible heater.

In various embodiments, the method further comprises removing the first flexible heater from the thermoplastic panel, and compressing the thermoplastic panel between the third tool and the fourth tool, after the first flexible heater is removed, while the thermoplastic panel is at the forming temperature, wherein a surface roughness of the first surface of the thermoplastic panel is decreased in response to compressing the thermoplastic panel between the third tool and the fourth tool with the first flexible heater removed from the thermoplastic panel.

In various embodiments, the thermoplastic panel is heated to the forming temperature at the first time via the first flexible heater.

In various embodiments, the thermoplastic panel is heated to the forming temperature at the first time via the second flexible heater.

In various embodiments, the thermoplastic panel is bent about a first axis extending along a first direction with respect to the thermoplastic panel in response to being compressed between the first tool and the second tool, and the thermoplastic panel is bent about a second axis extending along a second direction with respect to the thermoplastic panel in response to being compressed between the third tool and the fourth tool, wherein the first direction is substantially orthogonal to the second direction.

A method for forming a reinforced thermoplastic is disclosed, comprising heating a thermoplastic panel to a forming temperature at a first time, compressing the thermoplastic panel between a first tool and a second tool while the thermoplastic panel is at the forming temperature, cooling the thermoplastic panel to a hardened temperature, the hardened temperature is cooler than the forming temperature, disposing a first flexible heater on a first surface of the thermoplastic panel, disposing the thermoplastic panel between a third tool and a fourth tool, applying tension to the thermoplastic panel, heating the thermoplastic panel to the forming temperature at a second time via the first flexible heater while maintaining tension on the thermoplastic panel to maintain a curvature of the thermoplastic panel about a first axis, and compressing the thermoplastic panel between the third tool and the fourth tool while the thermoplastic panel is at the forming temperature.

In various embodiments, applying tension to the thermoplastic panel includes applying a lateral tension to the thermoplastic panel.

In various embodiments, applying tension to the thermoplastic panel includes applying a longitudinal tension to the thermoplastic panel.

In various embodiments, the thermoplastic panel is bent about the first axis extending along a first direction with respect to the thermoplastic panel in response to being compressed between the first tool and the second tool, and the thermoplastic panel is bent about a second axis extending along a second direction with respect to the thermoplastic panel in response to being compressed between the third tool and the fourth tool.

In various embodiments, the method further comprises applying a compaction roller to the first surface of the thermoplastic panel to smooth out any wrinkles in the thermoplastic panel after heating the thermoplastic panel to the forming temperature at the second time.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The thermoforming process, as described herein, may provide a relatively quick manufacturing process, e.g., on the order of minutes, of a thermoplastic panel, such as the outer skin for a fan cowl. The thermoforming process, as described herein, may provide a manufacturing process for transforming a flat thermoplastic panel into a relatively complex geometry, while minimizing, or eliminating, wrinkling.

Figure 1A:
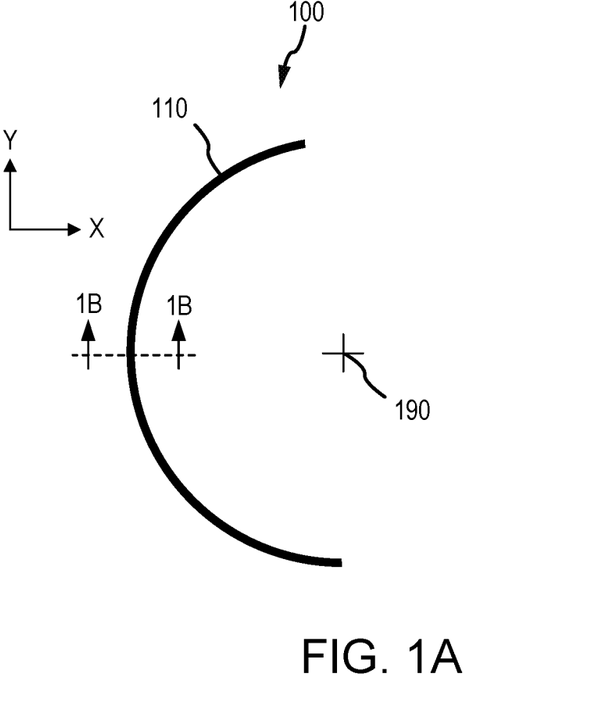
FIG. 1A illustrates a front-view profile of a fan cowl half having a semi-cylindrical geometry, in accordance with various embodiments.

With reference to FIG. 1A, a fan cowl half 100 is illustrated, in accordance with various embodiments. Fan cowl half 100 may comprise an outer skin 110. Outer skin 110 may comprise a semi-cylindrical geometry when viewed from the aft direction, as shown in the illustrated embodiment. Outer skin 110 may define a centerline axis 190. Outer skin 110 may be bent around centerline axis 190.

Figure 1B:
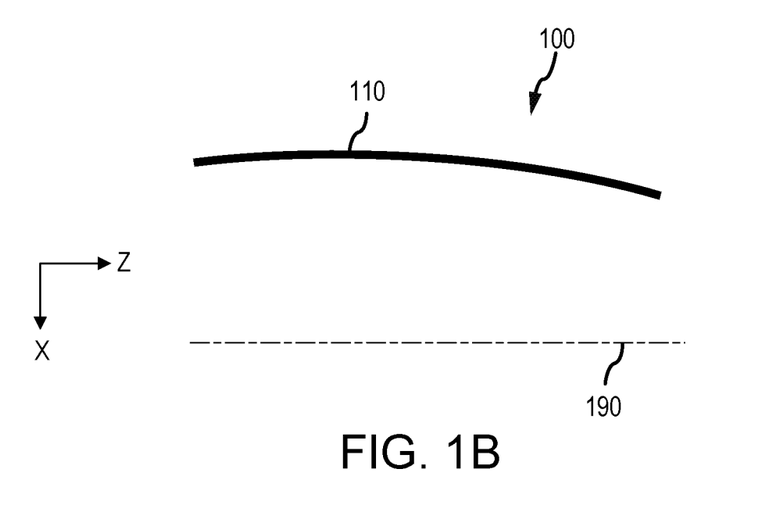
FIG. 1B illustrates a section view of the fan cowl half of FIG. 1A having a rounded geometry, in accordance with various embodiments.

With reference to FIG. 1B, a section view of fan cowl half 100 is illustrated, in accordance with various embodiments. Outer skin 110 may be contoured along the longitudinal direction (i.e., the Z-direction). Stated differently, outer skin 110 may comprise a non-linear geometry (e.g., rounded loft) along the longitudinal direction.

Outer skin 110 may be made from a reinforced (e.g., carbon, glass, polyamide fiber) thermoplastic. Various thermoplastics may be used for forming thermoplastic components, including amorphous thermoplastics (e.g., Polyetherimide (PEI), Polycarbonate (PC), Polysulfone (PSU), Polyethersulfone (PES)) and semi crystalline thermoplastics (Polyvinylidene fluoride (PVDF), Polytetrafluoroethylene (PTFE), Polyphenylene Sulfide (PPS), Polyetheretherketone (PEEK), Polyetherketoneketone (PEKK), Polyaryletherketone (PAEK). In accordance with various embodiments, it may be desirable to manufacture outer skin 110 from a reinforced semi-crystalline thermoplastic in order to benefit from the increased temperature and/or chemical resistance afforded thereby.

In accordance with various embodiments, outer skin 110 may be manufactured using a thermoforming process. Outer skin 110 may be manufactured as a single, monolithic structure for large applications, such as a fan cowl half. In this regard, it may be desirable to form outer skin 110 to be contoured. Furthermore, because outer skin 110 serves as an aerodynamic surface in fan cowl applications, it may be desirable for outer skin 110 to be formed having a smooth outer surface and to minimize wrinkling during the forming process. In this regard, outer skin 110 may be manufactured using a thermoforming process, as described herein.

Figure 2A:
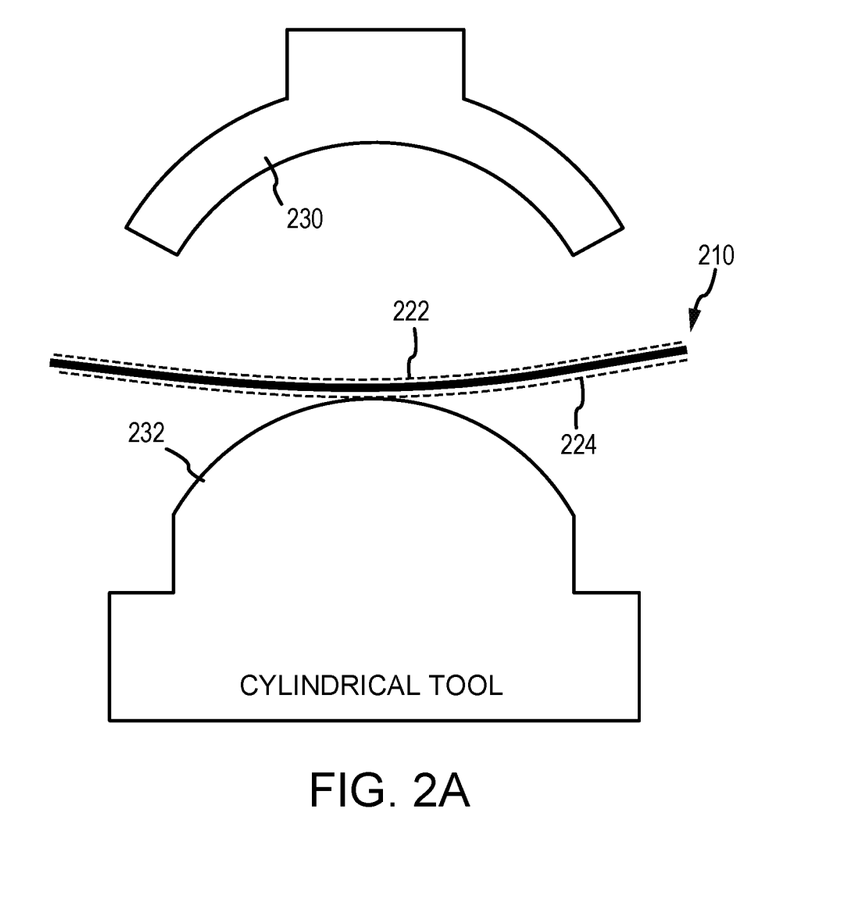
FIGS. 2A through FIG. 2I illustrate various steps of a thermoforming process for a thermoplastic panel, in accordance with various embodiments.
Figure 2B:
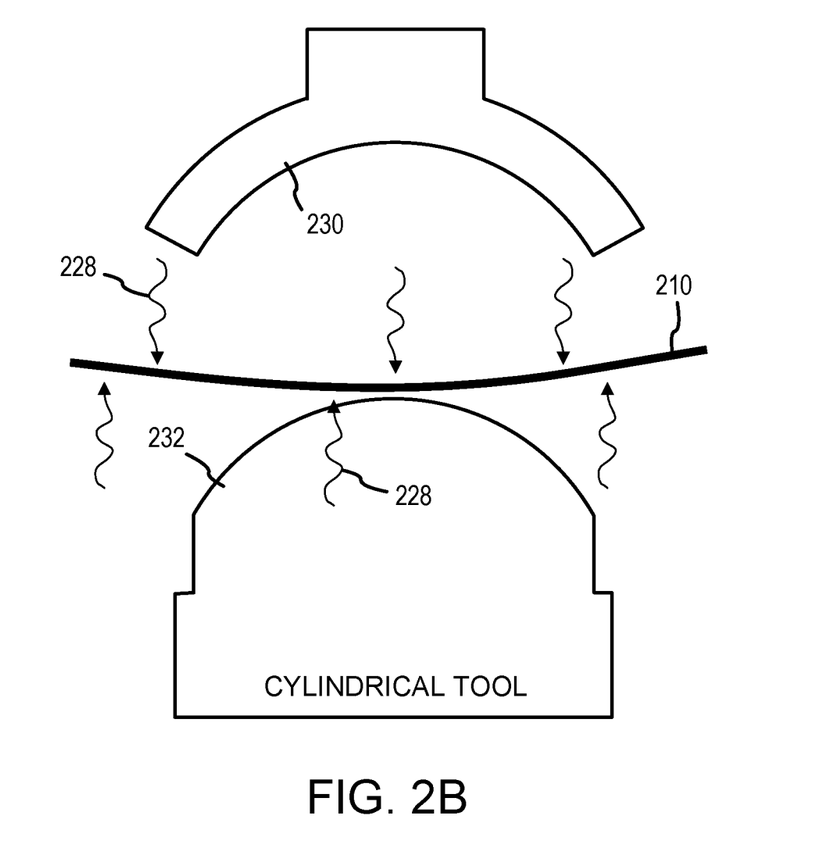
Figure 3:
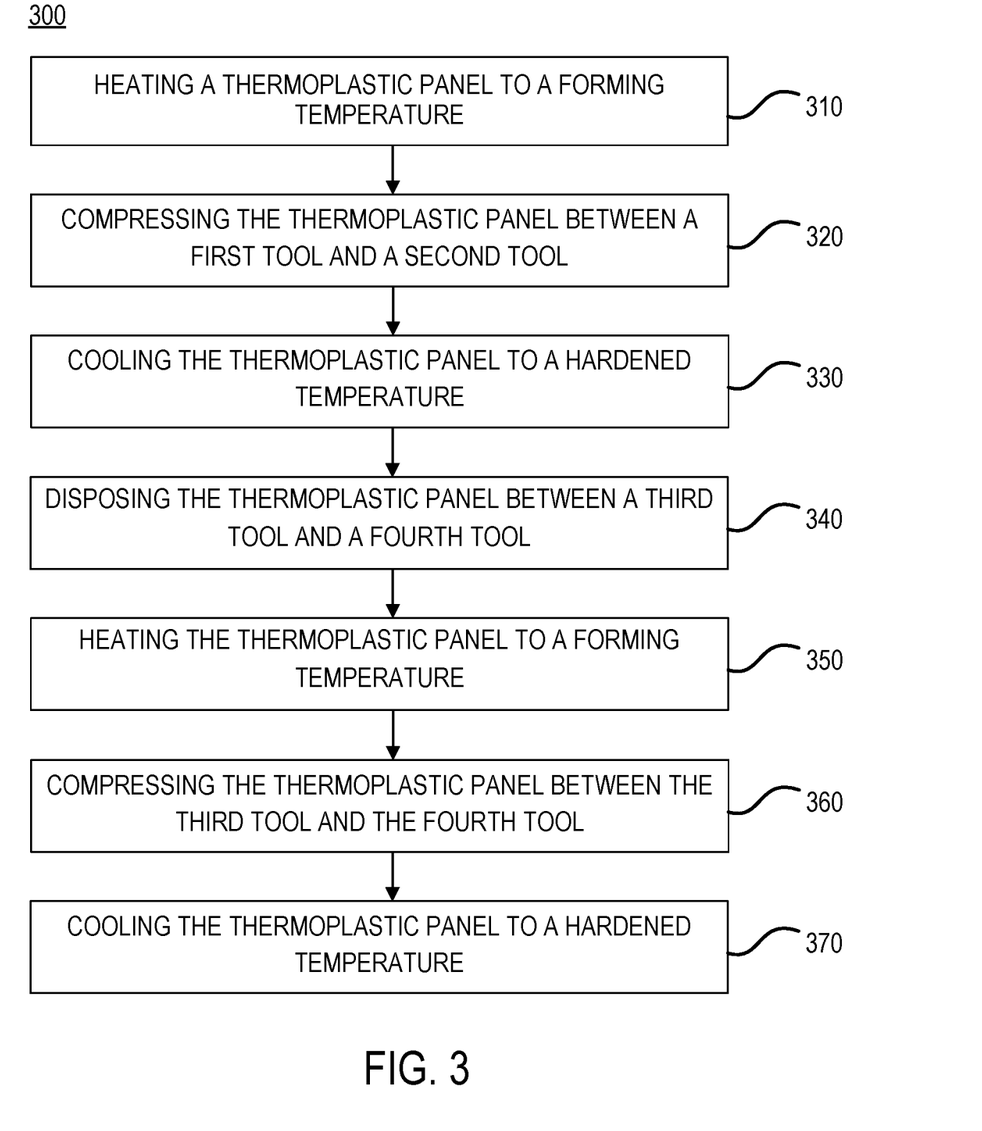
FIG. 3 provides a flow chart for a method for thermoforming a thermoplastic panel, in accordance with various embodiments.

With combined reference to FIG. 2A, FIG. 2B, and FIG. 3, a method 300 for forming a thermoplastic panel may include heating a reinforced thermoplastic panel to a pliable forming temperature (step 310). Step 310 may include applying heat to thermoplastic panel 210. Thermoplastic panel 210 may be heated to a sufficient forming temperature such that the thermoplastic panel 210 becomes pliable for forming purposes. For example, a pliable forming temperature for a thermoplastic panel may be between 190 and 750° F. (87.8-398.9° C.), in accordance with various embodiments. The suitable pliable forming temperature may vary depending on the particular thermoplastic material being used, as well as other factors, such as the thickness of the panel. As used herein, the term "forming temperature" refers to a range of temperatures wherein the thermoplastic panel 210 is suitable for forming (usually at or above the melt temperature), in accordance with various embodiments. For example, thermoplastic panel 210 may be suitably pliable at a range of temperatures wherein the thermoplastic panel 210 is maintained during each forming, or stamping, step. In this regard, the forming temperature of step 310 and step 350, as described herein, need not be the exact same temperature. Rather, the forming temperature of step 310 and step 350 may be different temperatures that fall withing the range of temperatures wherein the thermoplastic panel 210 is suitable for forming. For example, a thermoplastic panel comprising PEEK may comprise a melting point temperature of approximately 649° F. (343° C.) and a glass transition temperature of approximately 289° F. (143° C.). In this regard, a thermoplastic panel comprising PEEK may be heated to a forming temperature of approximately 649° F. (343° C.) or greater during the stamping process(es) and may be cooled to a hardened temperature of approximately 289° F. (143° C.) or less during the moving or shuttling of the thermoplastic panel between heating steps.

In various embodiments, with particular focus on FIG. 2A, thermoplastic panel 210 is heated using one or more flexible heaters, such as first flexible heater 222 and/or second flexible heater 224. First flexible heater 222 and second flexible heater 224 may comprise an electrical resistance heater in blanket form. For example, first flexible heater 222 and second flexible heater 224 may comprise a sheet of a flexible material, such as a polymer for example, with built-in electrical resistors configured to conduct heat in response to an electrical current being applied therethrough. First flexible heater 222 may be placed against a first surface of thermoplastic panel 210. Second flexible heater 224 may be placed against a second surface of thermoplastic panel 210. Second flexible heater 224 may be placed opposite thermoplastic panel 210 from first flexible heater 222.

In various embodiments, with particular focus on FIG. 2A, thermoplastic panel 210 is heated by transferring thermodynamic energy, illustrated by arrows 228, to thermoplastic panel 210. For example, heat lamps (e.g., infrared heat lamps) may heat thermoplastic panel 210 by transferring electromagnetic radiation to thermoplastic panel 210. In various embodiments, thermoplastic panel 210 is heated under a bank of infrared lamps and shuttled (e.g., via the gripping members) to the first tool 230 and second tool 232 for stamping. It is contemplated that any suitable method of heating thermoplastic panel 210 may be used during step 310, without departing from the scope of the present disclosure.

Figure 2C:
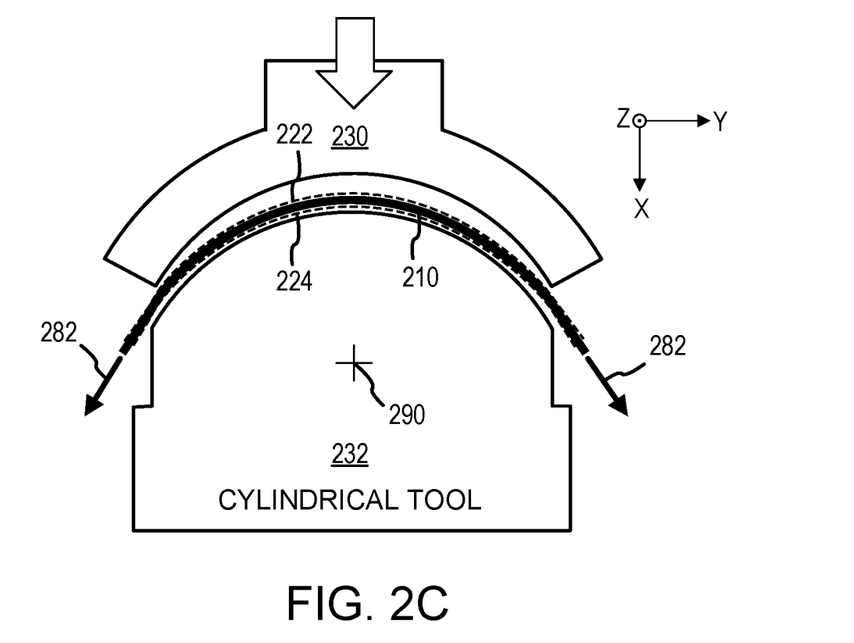
Figure 2D:
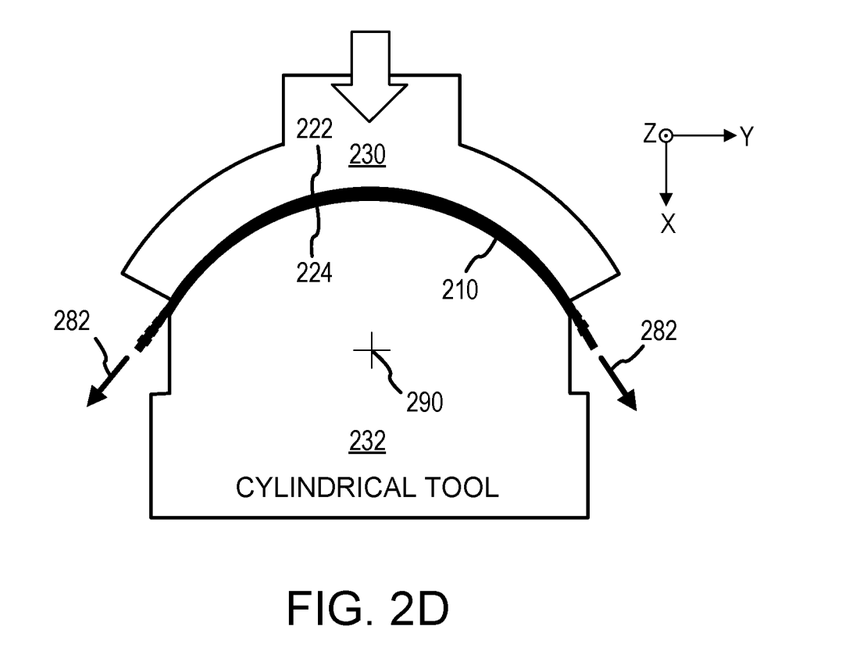

In various embodiments, method 300 includes compressing the thermoplastic panel between a first tool and a second tool (step 320). Step 320 may include compressing thermoplastic panel 210 between a first tool 230 and a second tool 232 while thermoplastic panel 210 is at the forming temperature. Step 320 may include compressing thermoplastic panel 210 between first tool 230 and second tool 232 while maintaining lateral tension, illustrated by arrows 282 in FIG. 2C and FIG. 2D, on the thermoplastic panel. Said lateral tension may be applied using an automated process. Said lateral tension may be applied along the horizontal direction (Y-direction), along the downward direction (positive X-direction), or any angle therebetween for compressing the thermoplastic panel 210 against the second tool 232 and to prevent wrinkling and/or deconsolidation of thermoplastic panel 210 during the compressing step. Said lateral tension may be applied using a gripping member, for example discrete gripping members disposed along the perimeter of the thermoplastic panel 210 or a single gripping member extending along the perimeter of thermoplastic panel 210, operatively coupled to one or more actuators configured to position the gripping member(s) during forming of the thermoplastic panel. First tool 230 and a second tool 232 may collectively comprise a forming tool whereby thermoplastic panel 210 is formed into a desired geometry. For example, first tool 230 may comprise an upper portion of the forming tool and second tool 232 may comprise a lower portion of the forming tool. First tool 230 and/or second tool 232 may be made from a material capable of withstanding thermoforming temperatures, such as metal or ceramic, among other materials. With reference to FIG. 2C, the thermoplastic panel 210 may bend about a first axis 290 extending along a first direction (i.e., the Z-direction) with respect to the thermoplastic panel, in response to being compressed between first tool 230 and second tool 232. In various embodiments, thermoplastic panel 210 is bent into a semi cylindrical geometry in response to being compressed between first tool 230 and second tool 232. In various embodiments, thermoplastic panel 210 is bent solely about the first axis 290 during step 320.

Figure 2E:
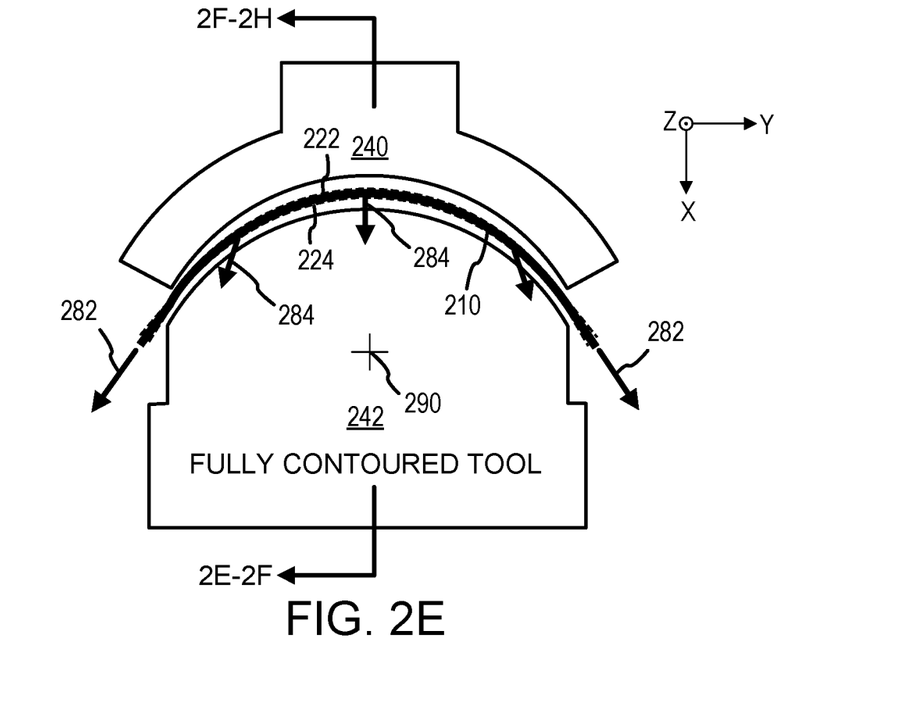
Figure 2F:
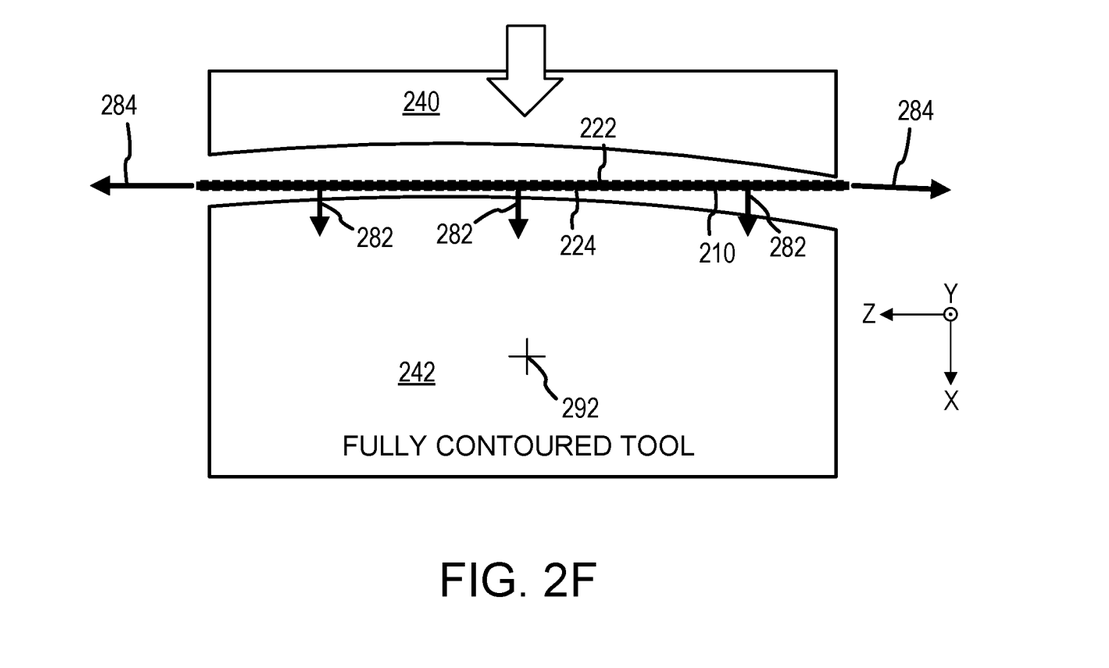

With combined reference to FIG. 2E, FIG. 2F, and FIG. 3, method 300 includes cooling the thermoplastic panel to a hardened temperature (step 330). Step 330 may include cooling thermoplastic panel 210 to a hardened temperature, wherein the term "hardened temperature," as used herein, refers to a temperature of thermoplastic panel 210 wherein the thermoplastic panel 210 is sufficiently hardened such that the thermoplastic panel 210 may be handled and transferred between tools while generally maintaining the shape of the thermoplastic panel 210. The hardened temperature is cooler than the forming temperature, usually less than the glass transition temperature. In this manner, thermoplastic panel 210 may be transferred between tools for additional forming while generally maintaining its cylindrical shape. In various embodiments, thermoplastic panel 210 is cooled by removing or turning off the heat source used for heating the thermoplastic panel 210 to its forming temperature, allowing heat from thermoplastic panel 210 to dissipate into the ambient air.

In various embodiments, method 300 includes disposing the thermoplastic panel between a third tool and a fourth tool (step 340). Step 340 may include moving thermoplastic panel 210 from between first tool 230 and second tool 232 (see FIG. 2D) to between third tool 240 and fourth tool 242. As illustrated in FIG. 2E, third tool 240 and fourth tool 242 may comprise a semi cylindrical geometry when viewed along the first direction (i.e., the Z-direction), similar to first tool 230 and second tool 232. However, as illustrated in FIG. 2F, third tool 240 and fourth tool 242 may comprise curved geometry when viewed along a second direction (i.e., transversely, along the Y-direction). In this regard, third tool 240 and fourth tool 242 may be referred to herein collectively as a "fully contoured" tool. In this regard, third tool 240 and fourth tool 242 may be similar to first tool 230 and second tool 232, except that third tool 240 and fourth tool 242 include additional contouring not found in first tool 230 and second tool 232.

In various embodiments, method 300 includes heating the thermoplastic panel to a forming temperature (step 350). Step 350 may include heating thermoplastic panel 210 to a forming temperature while maintaining tension on the thermoplastic panel 210 to maintain the curvature of the thermoplastic panel 210 (i.e., the curvature of the thermoplastic panel 210 formed during step 320) about the first axis 290. In various embodiments, step 350 includes placing first flexible heater 222 against a first surface of thermoplastic panel 210. In various embodiments, step 350 includes placing second flexible heater 224 against a second surface of thermoplastic panel 210. In various embodiments, step 350 includes heating thermoplastic panel 210 to the forming temperature, via first flexible heater 222 and second flexible heater 224.

In various embodiments, thermoplastic panel 210 may be heated by transferring thermodynamic energy, to thermoplastic panel 210 from the top surface. For example, heat lamps (e.g., infrared heat lamps) may heat thermoplastic panel 210 by transferring electromagnetic radiation to thermoplastic panel 210. It is contemplated that any suitable method of heating thermoplastic panel 210 may be used during step 310, without departing from the scope of the present disclosure. This heating may be coupled with a second flexible heater 224 heated against the second surface of the thermoplastic panel 210.

In various embodiments, tension may be applied to thermoplastic panel 210 in order to minimize wrinkling of thermoplastic panel 210 as the thermoplastic panel 210 is heated to the forming tension wherein thermoplastic panel 210 is pliable, as well as during the forming process wherein thermoplastic panel 210 is compressed to a fully contoured geometry. Lateral tension, as illustrated by arrows 282, may be applied to thermoplastic panel 210 to maintain the curvature of the thermoplastic panel 210 (i.e., the curvature of the thermoplastic panel 210 formed during step 320) about the first axis 290, and to further mitigate wrinkling and/or deconsolidation of thermoplastic panel 210 during the compressing step. Longitudinal tension, as illustrated by arrows 284, may be applied to thermoplastic panel 210 to maintain the curvature of the thermoplastic panel 210 (i.e., the curvature of the thermoplastic panel 210 formed during step 320) about the first axis 290, and to further mitigate wrinkling and/or deconsolidation of thermoplastic panel 210 during the compressing step. In this manner, tension may be applied outwardly on thermoplastic panel 210 in essentially all directions to maintain the curvature of the thermoplastic panel 210 (i.e., the curvature of the thermoplastic panel 210 formed during step 320) about the first axis 290, and to further mitigate wrinkling and/or deconsolidation of thermoplastic panel 210 during the compressing step.

Figure 2G:
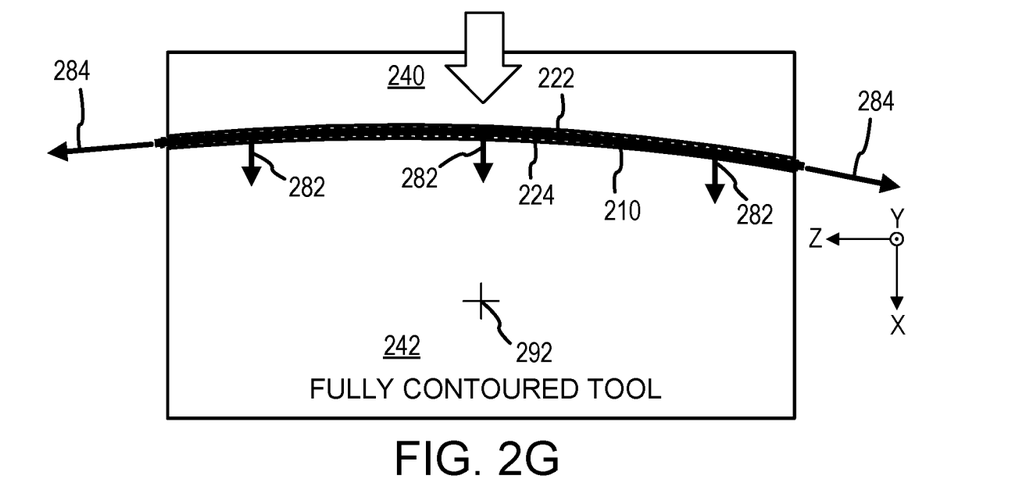

In various embodiments, method 300 includes compressing the thermoplastic panel between the third tool and the fourth tool (step 360). With combined reference to FIG. 2G and FIG. 3, step 360 may include compressing thermoplastic panel 210 between third tool 240 and fourth tool 242 while the thermoplastic panel is at the forming temperature. Thermoplastic panel 210 may be bent about a second axis 292 extending along a second direction (e.g., the Y-direction) with respect to the thermoplastic panel 210 in response to being compressed between third tool 240 and fourth tool 242. The second direction (i.e., the Y-direction) may be substantially perpendicular to the first direction (i.e., the Z-direction).

In various embodiments, in place of, or in addition to, third tool 240, rollers may be used to compress thermoplastic panel 210 against fourth tool 242 in order to form thermoplastic panel 210 into the fully contoured geometry. Rollers may aid in removing any wrinkling from thermoplastic panel 210 during the forming process. In various embodiments, in place of, or in addition to, longitudinal tension 284, rollers may be used to compress thermoplastic panel 210 against fourth tool 242 in order to form thermoplastic panel 210 into the fully contoured geometry. In this regard, method 300 may further include rolling out the thermoplastic panel 210 between step 350 and step 360. Method 300 may include applying a roller (e.g., a compaction roller) to the surface of thermoplastic panel 210 to smooth out any wrinkles in thermoplastic panel 210.

Figure 2H:
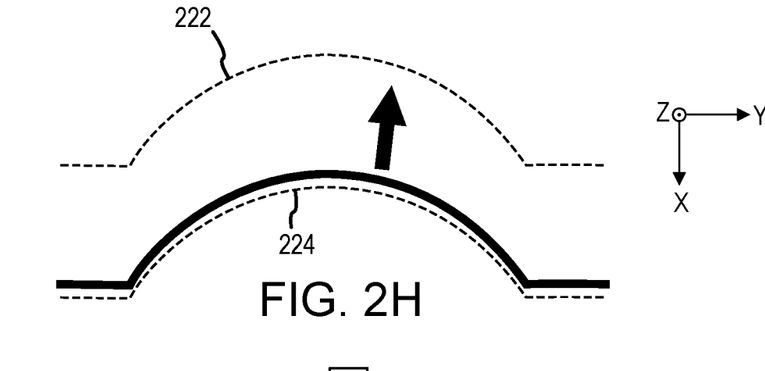
Figure 2I:
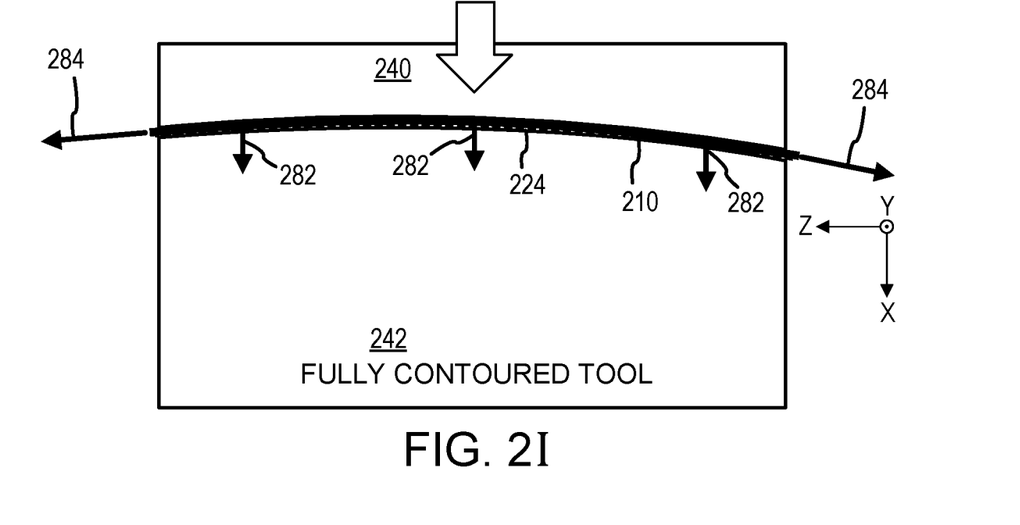

With combined reference to reference to FIG. 2H and FIG. 2I, in various embodiments, step 360 may further include removing first flexible heater 222 from thermoplastic panel 210. In various embodiments, first flexible heater 222 may be removed while thermoplastic panel 210 is still laying on fourth tool 242 so that thermoplastic panel 210 does not lose its fully contoured geometry. Thermoplastic panel 210 may then be compressed between third tool 240 and fourth tool 242 for a second time such that the outer surface of thermoplastic panel 210 is formed smooth against the surface of third tool 240, without interference of flexible heater 222. This additional compression may occur seconds (e.g., within 30 seconds) after the first flexible heater 222 is removed from the thermoplastic panel. However, it is contemplated that thermoplastic panel 210 may be cooled, removed from fourth tool 242, have first flexible heater removed, and then the thermoplastic panel 210 moved back onto fourth tool 242, and reheated to the forming temperature for a second compression without first flexible heater 222 in order to reduce the surface roughness of (i.e., to smoothen) thermoplastic panel 210.

In various embodiments, method 300 includes cooling the thermoplastic panel to a hardened temperature (step 370). With combined reference to FIG. 2I and FIG. 3, step 370 may include cooling the thermoplastic panel 210 to a hardened temperature such that the thermoplastic panel 210 may be removed from between the third tool 240 and fourth tool 242 while generally maintaining its fully contoured shape. The thermoplastic panel 210 may be finished by removing excess material from the perimeter of the thermoplastic panel 210 to achieve a desired profile of the thermoplastic panel 210.

Figure 4:
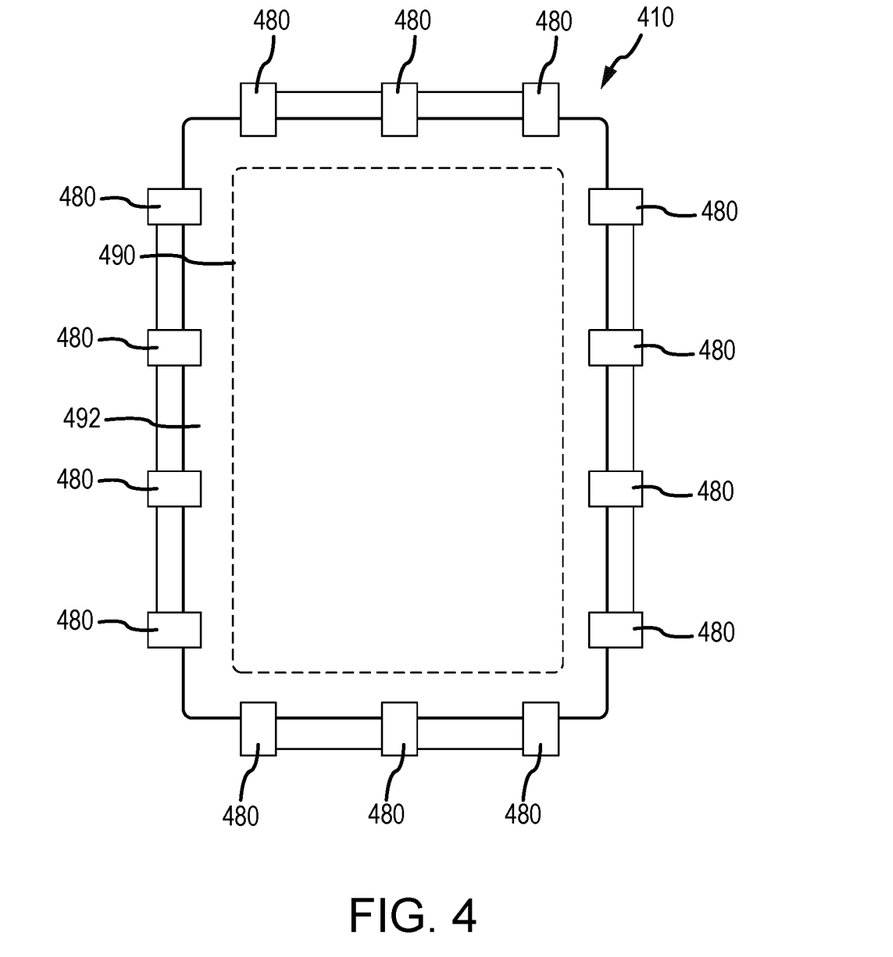
FIG. 4 illustrates a reinforced thermoplastic panel having a central portion for being heated and a peripheral edge which remains below a glass transition temperature to evenly distribute a tension force applied by one or more gripping members, in accordance with various embodiments.

With reference to FIG. 4, a reinforced thermoplastic panel 410 is illustrated with a plurality of gripping members 480 for applying tension to thermoplastic panel 410 during the heating and stamping steps as described herein. In various embodiments, heat may be applied to only a central portion (e.g., within dashed line 490) such that the temperature of a peripheral edge 492 of the thermoplastic panel 410 is not heated, or at least remains below a glass transition temperature of thermoplastic panel 410 such that the peripheral edge 492 of thermoplastic panel 410 remains rigid to aid in applying uniform tension along the perimeter of thermoplastic panel 410. Stated differently, heat is focus towards the central portion (that portion of thermoplastic panel 410 that is being formed or stamped) and the peripheral edge 492 of the thermoplastic panel 410 remains rigid (below a glass transition temperature of thermoplastic panel 410) such that the tension force applied by gripping members 480 is evenly distributed along the peripheral edge 492 of thermoplastic panel 410. Any number of gripping members 480 may be used at each end (e.g., left, right, top, bottom in FIG. 4) of thermoplastic panel 410. In this regard, one or more gripping members 480 may be used to apply tension to thermoplastic panel 410.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a reinforced thermoplastic, comprising:

heating a thermoplastic panel to a forming temperature at a first time;

compressing the thermoplastic panel between a first tool and a second tool while the thermoplastic panel is at the forming temperature, wherein the thermoplastic panel is bent about a first axis extending along a first direction with respect to the thermoplastic panel in response to being compressed between the first tool and the second tool;

cooling the thermoplastic panel to a hardened temperature, the hardened temperature is cooler than the forming temperature;

disposing the thermoplastic panel between a third tool and a fourth tool;

heating the thermoplastic panel to the forming temperature at a second time while maintaining tension on the thermoplastic panel to maintain a curvature of the thermoplastic panel about the first axis; and compressing the thermoplastic panel between the third tool and the fourth tool while the thermoplastic panel is at the forming temperature, wherein the thermoplastic panel is bent about a second axis extending along a second direction with respect to the thermoplastic panel in response to being compressed between the third tool and the fourth tool, wherein the second direction is different from the first direction.

2. The method of claim 1, wherein the thermoplastic panel is heated to the forming temperature at the first time via an infrared lamp.

3. The method of claim 1, wherein the thermoplastic panel is heated to the forming temperature at the second time via an infrared lamp.

4. The method of claim 1, wherein a central portion of the thermoplastic panel is heated to the forming temperature and a peripheral edge of the thermoplastic panel remains below a glass transition temperature to aid in evenly distributing said tension.

5. The method of claim 1, wherein the thermoplastic panel is heated to the forming temperature at the first time via a first flexible heater.

6. The method of claim 5, wherein the thermoplastic panel is heated to the forming temperature at the first time via the first flexible heater and a second flexible heater.

7. The method of claim 1, wherein the thermoplastic panel is heated to the forming temperature at the second time via a first flexible heater.

8. The method of claim 7, wherein the thermoplastic panel is heated to the forming temperature at the second time via the first flexible heater and the second flexible heater.

9. The method of claim 1, wherein the first direction is substantially perpendicular to the second direction.

10. A method for forming a reinforced thermoplastic, comprising:

heating a thermoplastic panel to a forming temperature at a first time;

compressing the thermoplastic panel between a first tool and a second tool while the thermoplastic panel is at the forming temperature;

cooling the thermoplastic panel to a hardened temperature, the hardened temperature is cooler than the forming temperature;

disposing a first flexible heater on a first surface of the thermoplastic panel;

disposing the thermoplastic panel between a third tool and a fourth tool;

heating the thermoplastic panel to the forming temperature at a second time via the first flexible heater; and compressing the thermoplastic panel between the third tool and the fourth tool while the thermoplastic panel is at the forming temperature.

11. The method of claim 10, further comprising disposing a second flexible heater on a second surface of the thermoplastic panel, wherein the thermoplastic panel is heated to the forming temperature at the second time via the first flexible heater and the second flexible heater.

12. The method of claim 10, further comprising:
removing the first flexible heater from the thermoplastic panel; and
compressing the thermoplastic panel between the third tool and the fourth tool, after the first flexible heater is removed, while the thermoplastic panel is at the forming temperature, wherein a surface roughness of the first surface of the thermoplastic panel is decreased in response to compressing the thermoplastic panel between the third tool and the fourth tool with the first flexible heater removed from the thermoplastic panel.

13. The method of claim 10, wherein the thermoplastic panel is heated to the forming temperature at the first time via the first flexible heater.

14. The method of claim 11, wherein the thermoplastic panel is heated to the forming temperature at the first time via the second flexible heater.

15. The method of claim 10, wherein the thermoplastic panel is bent about a first axis extending along a first direction with respect to the thermoplastic panel in response to being compressed between the first tool and the second tool; and
the thermoplastic panel is bent about a second axis extending along a second direction with respect to the thermoplastic panel in response to being compressed between the third tool and the fourth tool, wherein the first direction is substantially orthogonal to the second direction.

16. A method for forming a reinforced thermoplastic, comprising:
heating a thermoplastic panel to a forming temperature at a first time;
compressing the thermoplastic panel between a first tool and a second tool while the thermoplastic panel is at the forming temperature;
cooling the thermoplastic panel to a hardened temperature, the hardened temperature is cooler than the forming temperature;
disposing a first flexible heater on a first surface of the thermoplastic panel;
disposing the thermoplastic panel between a third tool and a fourth tool;
applying tension to the thermoplastic panel;
heating the thermoplastic panel to the forming temperature at a second time via the first flexible heater while maintaining tension on the thermoplastic panel to maintain a curvature of the thermoplastic panel about a first axis; and
compressing the thermoplastic panel between the third tool and the fourth tool while the thermoplastic panel is at the forming temperature.

17. The method of claim 16, wherein applying tension to the thermoplastic panel includes applying a lateral tension to the thermoplastic panel.

18. The method of claim 16, wherein applying tension to the thermoplastic panel includes applying a longitudinal tension to the thermoplastic panel.

19. The method of claim 16, wherein the thermoplastic panel is bent about the first axis extending along a first direction with respect to the thermoplastic panel in response to being compressed between the first tool and the second tool; and
the thermoplastic panel is bent about a second axis extending along a second direction with respect to the thermoplastic panel in response to being compressed between the third tool and the fourth tool.

20. The method of claim 16, further comprising applying a compaction roller to the first surface of the thermoplastic panel to smooth out any wrinkles in the thermoplastic panel after heating the thermoplastic panel to the forming temperature at the second time.

* * * * *